United States Patent
Stinessen et al.

(10) Patent No.: US 9,624,753 B2
(45) Date of Patent: Apr. 18, 2017

(54) SUBSEA VALVE

(71) Applicant: Aker Subsea AS, Lysaker (NO)

(72) Inventors: Kjell Olav Stinessen, Oslo (NO); Knut Olaf Nyborg, Bekkestua (NO); Mats Hoffmann, Oslo (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 14/765,619

(22) PCT Filed: Feb. 5, 2014

(86) PCT No.: PCT/NO2014/000016
§ 371 (c)(1),
(2) Date: Aug. 4, 2015

(87) PCT Pub. No.: WO2014/123425
PCT Pub. Date: Aug. 14, 2014

(65) Prior Publication Data
US 2016/0003001 A1 Jan. 7, 2016

(30) Foreign Application Priority Data

Feb. 6, 2013 (NO) .................................. 20130195

(51) Int. Cl.
*E21B 34/04* (2006.01)
*F16K 41/00* (2006.01)
(Continued)

(52) U.S. Cl.
CPC .......... *E21B 34/04* (2013.01); *E21B 33/0385* (2013.01); *F16K 31/04* (2013.01); *F16K 41/00* (2013.01)

(58) Field of Classification Search
CPC ......... E21B 34/10; E21B 34/04; F16K 31/086
See application file for complete search history.

(56) References Cited

U.S. PATENT DOCUMENTS

| 4,671,486 A | 6/1987 | Giannini |
| 6,041,804 A * | 3/2000 | Chatufale ............... E21B 34/04 |
| | | 137/15.23 |

(Continued)

FOREIGN PATENT DOCUMENTS

| EP | 2021667 A1 | 2/2009 |
| GB | 2415552 A | 12/2005 |

(Continued)

OTHER PUBLICATIONS

Lovås, Bjørn, "International Search Report," prepared for PCT/NO2014/000016, as mailed May 5, 2014, four pages.

*Primary Examiner* — James G Sayre
(74) *Attorney, Agent, or Firm* — Winstead PC

(57) ABSTRACT

Subsea valve for control of fluid that can be contaminating and at elevated pressure and temperature, such as well or process fluids, the valve comprising an actuator unit and a valve part, the actuator unit can be operated in order to control the valve part, distinctive in that the actuator unit is magnetically coupled to the valve part and the coupling is through a barrier wall isolating the actuator unit from the valve part, and the actuator unit and a driving part of the magnetic coupling are arranged in a sealed actuator housing into which leakage of said contaminating fluid thereby has been eliminated.

11 Claims, 6 Drawing Sheets

Normal operation mode

Figure 4:
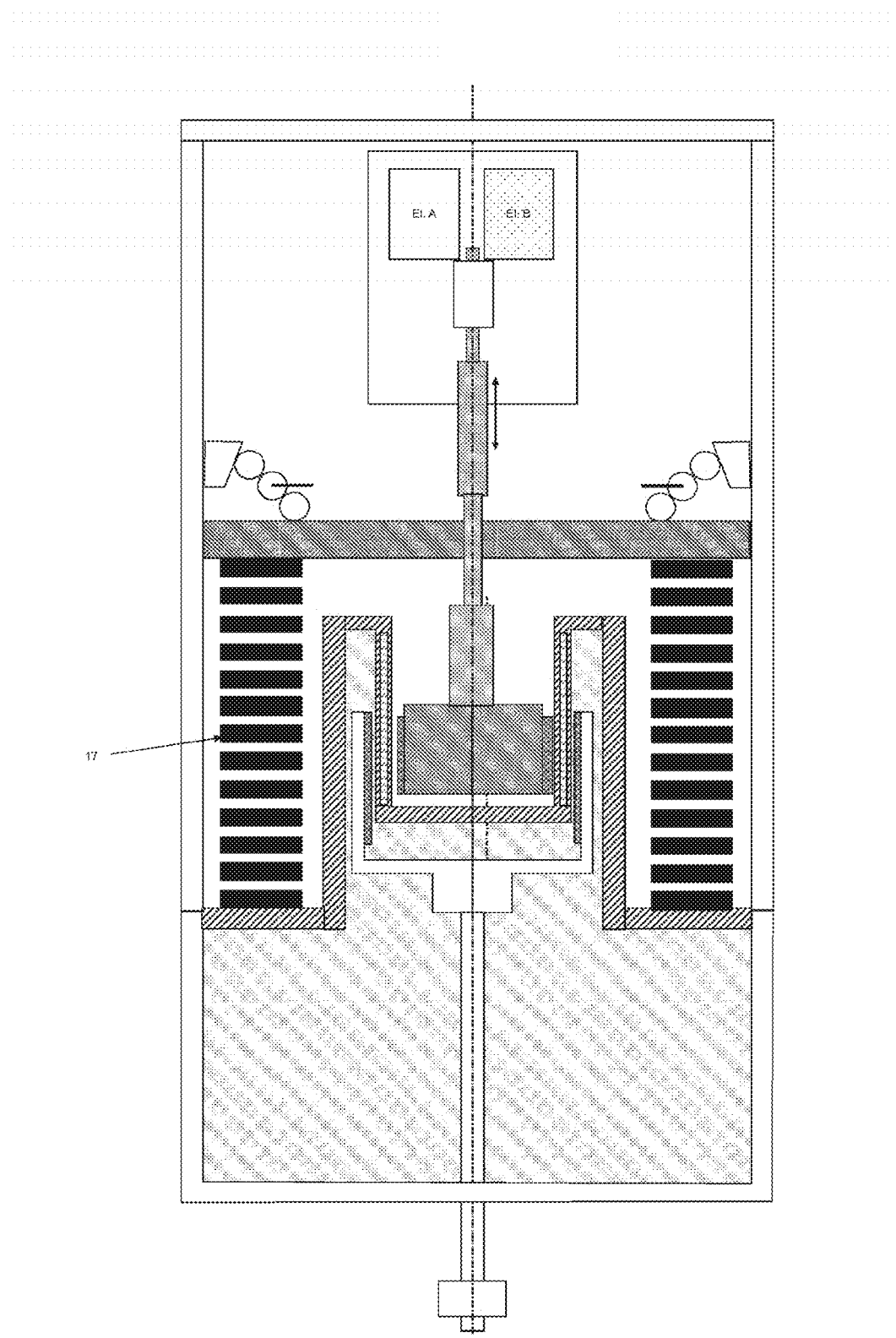

(51) Int. Cl.
*F16K 31/04* (2006.01)
*E21B 33/038* (2006.01)

(56) References Cited

U.S. PATENT DOCUMENTS

| | | | |
|---|---|---|---|
| 7,487,829 B2* | 2/2009 | McDonald | E21B 34/06 166/332.1 |
| 8,286,935 B2* | 10/2012 | White | E21B 34/04 251/129.01 |
| 2003/0155131 A1 | 8/2003 | Vick | |
| 2007/0125578 A1 | 6/2007 | McDonald et al. | |
| 2007/0204999 A1* | 9/2007 | Cowie | E21B 33/035 166/368 |
| 2007/0215343 A1 | 9/2007 | McDonald et al. | |
| 2009/0127485 A1* | 5/2009 | Wessel | F16K 31/56 251/69 |
| 2009/0293957 A1 | 12/2009 | White | |
| 2011/0037333 A1 | 2/2011 | Atallah et al. | |
| 2011/0057456 A1 | 3/2011 | Atallah et al. | |
| 2012/0032099 A1* | 2/2012 | Vick, Jr. | E21B 34/10 251/65 |
| 2015/0211331 A1* | 7/2015 | McHugh | E21B 33/037 166/336 |

FOREIGN PATENT DOCUMENTS

| | | |
|---|---|---|
| WO | WO-2004097837 A2 | 11/2004 |
| WO | WO-2007138244 A1 | 12/2007 |
| WO | WO-2007149795 A2 | 12/2007 |
| WO | WO-2011062867 A2 | 5/2011 |

* cited by examiner

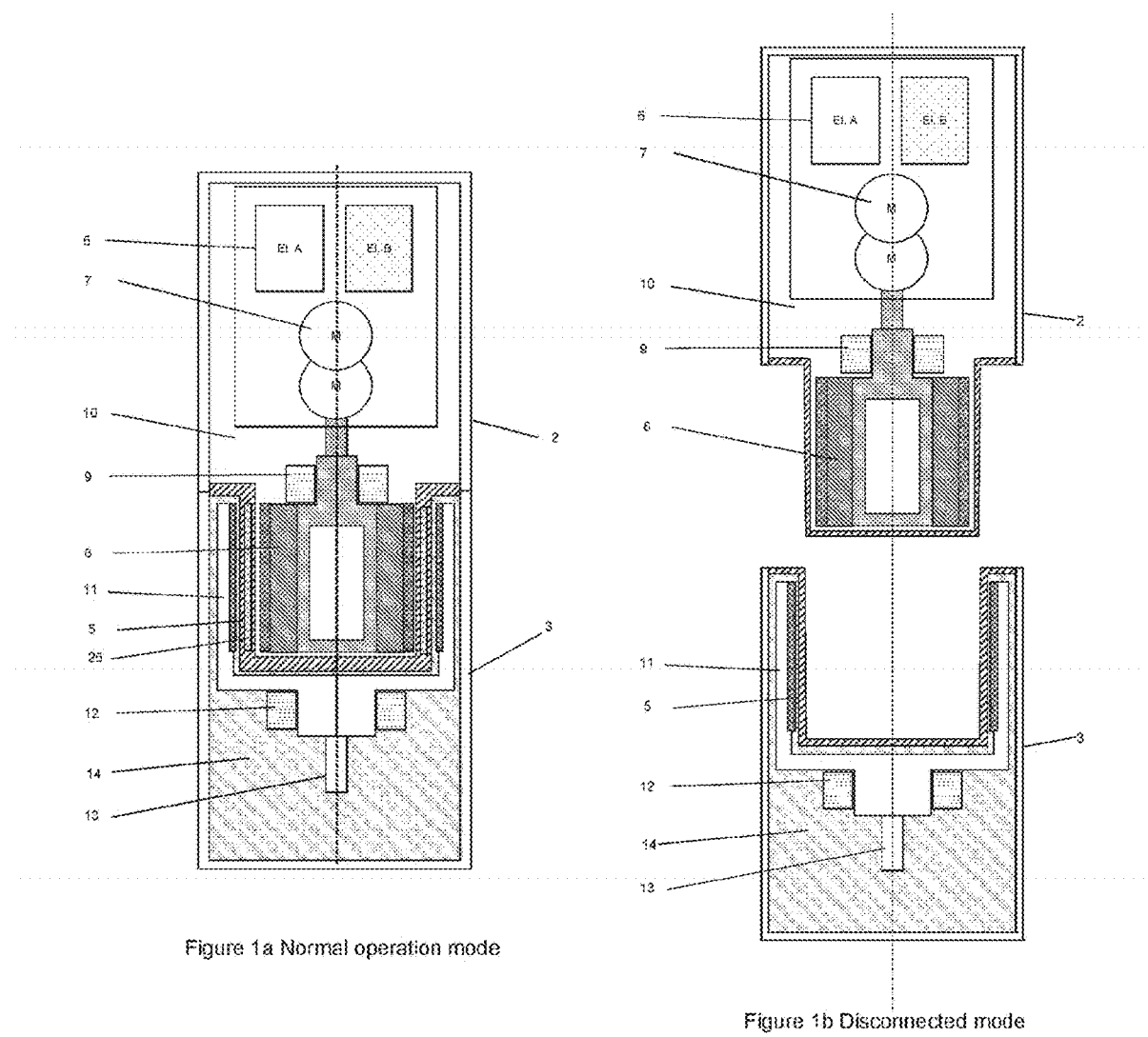
Figure 1a Normal operation mode
Figure 1b Disconnected mode

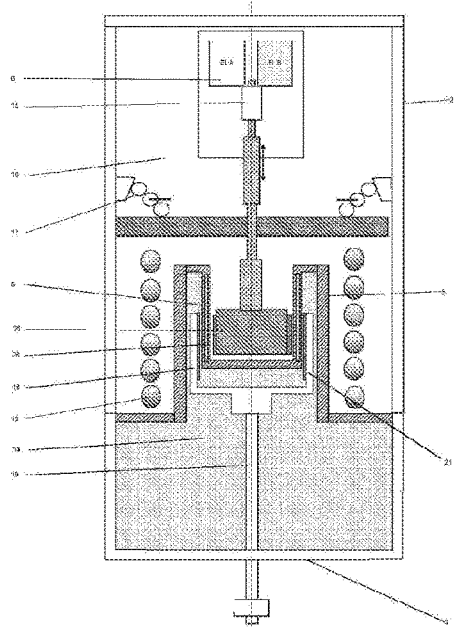
Figure 2a Normal operation mode
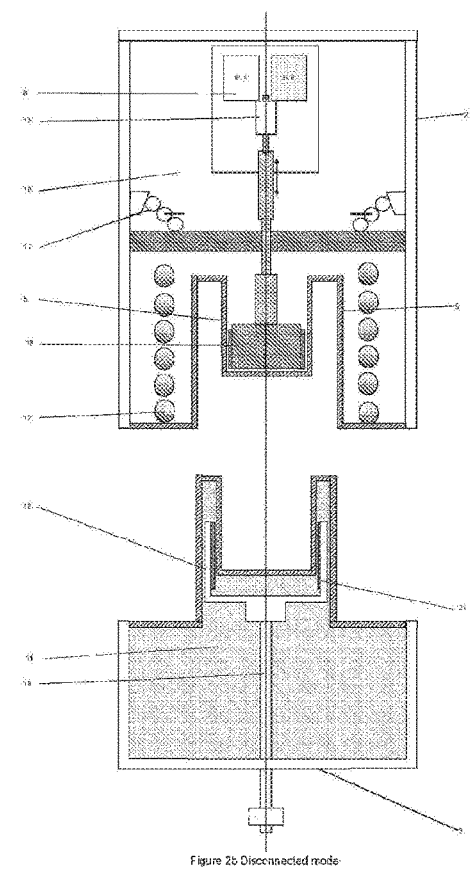
Figure 2b Disconnected mode

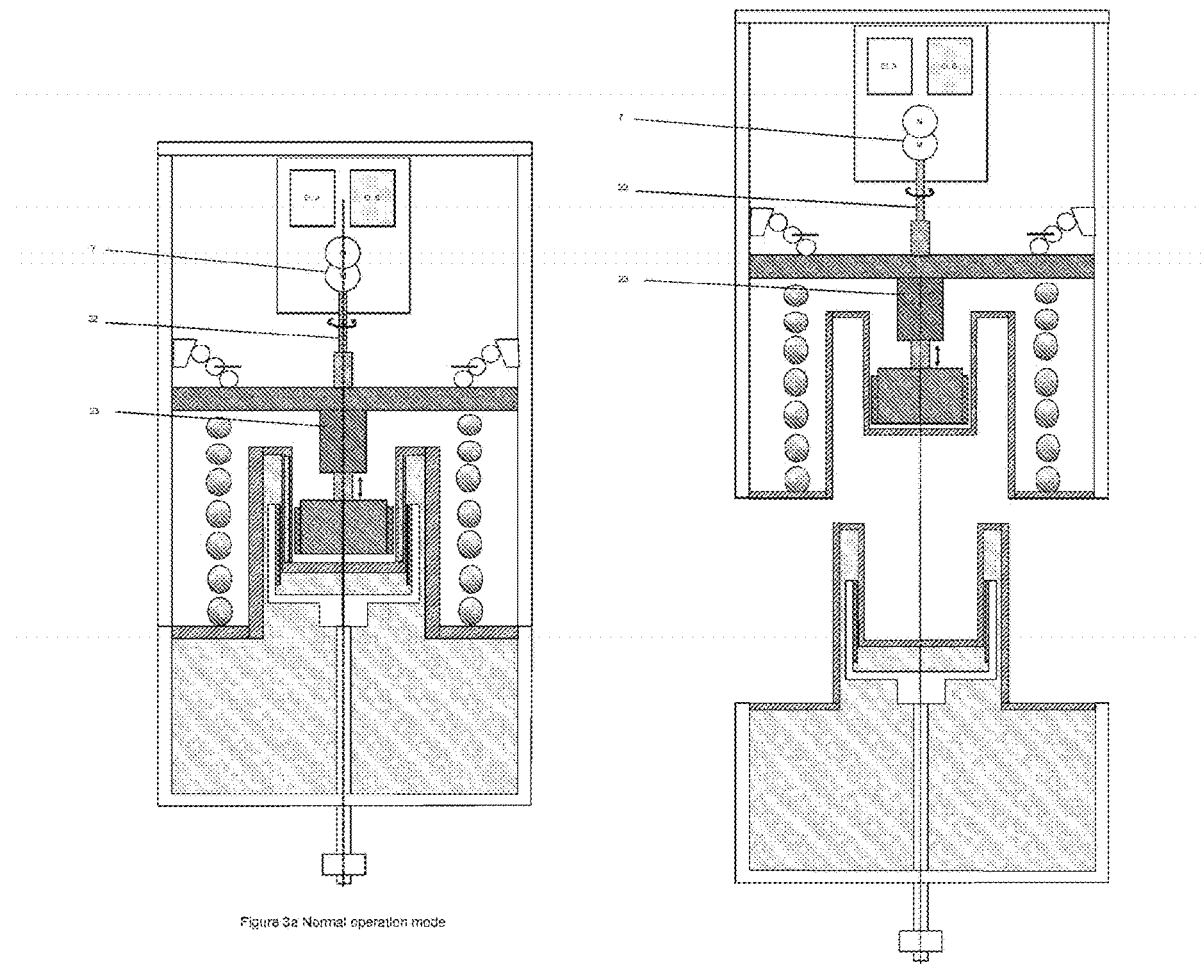

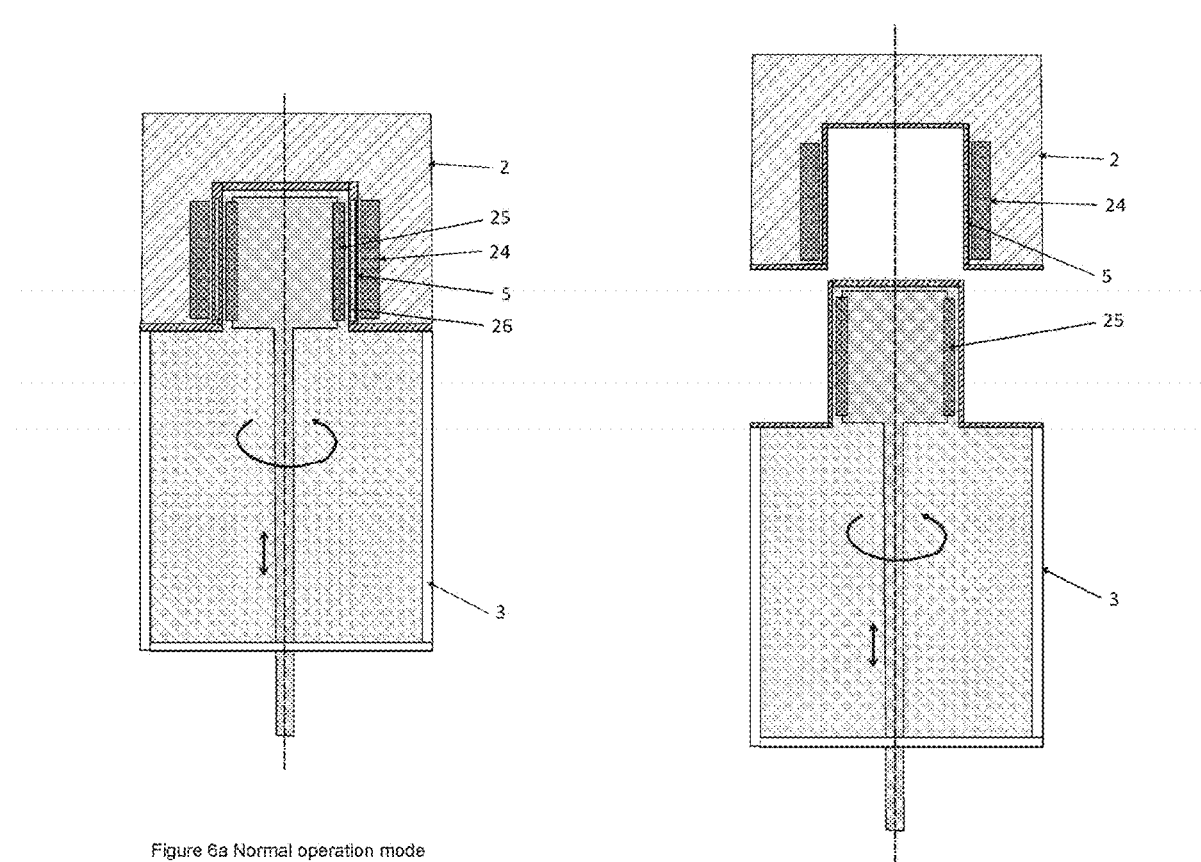
Figure 6a Normal operation mode
Figure 6b Disconnected mode

SUBSEA VALVE

FIELD OF THE INVENTION

The present invention relates to subsea valves controlled by actuators. More specifically, the invention relates to subsea valves controlled by actuators and the risk of leaking contaminating fluid that can be at high temperature and pressure, such as hydrocarbon fluid, from the valve into the valve actuator and the control system of the actuator or to the sea, which may result in loss of control of the valve or production system, a safety hazard and pollution of the sea.

Relevant valves are found in subsea hydrocarbon production systems with Xmas tree production gate valves, anti surge valves, subsea process systems, manifold control valves, pressure boosting control valves, injection control valves, subsea chokes and other valves or other actuator operated units located on the seabed in the vicinity of a number of subsea wellheads and being exposed on one side for contained fluid which should not be allowed to leak into the actuator.

BACKGROUND OF THE INVENTION AND PRIOR ART

Subsea Xmas tree production valves are controlled by actuators. Traditionally, the actuators have been hydraulic, which is considered reliable and rather safe. However, a shift towards electrical actuators is under development in the industry. This is mainly due to longer step outs of subsea installations. Longer step outs result in slower response time using hydraulic systems, as well as increased cost of hydraulic umbilicals. An electric actuator comprises an electric motor coupled mechanical, typical with a mechanical transmission, to the valve. The electrical actuator is coupled or integrated with an electrical power and control system.

Electric actuators are however somewhat less reliable than hydraulic actuators, which is solved by adding redundancy, but in the case of leakage of contaminating fluid into the actuator the control of the actuator and thereby the valve is lost. Lost production for a period of time can be very expensive, but worse, if the leakage continues into the electrical control system a severe safety problem can be the result. A fluid leakage path from the valve to sea can be arranged in order to avoid leakage into the control system if the seal between the valve and actuator fails, but the leakage path into the control system still exists, as well as a pollution problem.

In subsea well operations, bore pressure of more than 690 bars is common. A typical state of the art actuator and valve assembly design is to have a valve body with a valve element, the valve element, such as a gate element of a gate valve, is connected to a valve stem. A dynamic seal prevents leakage of well fluid along the valve stem toward the actuator. The actuator is electrically operated and it includes an electric motor which via a transmission is connected to the valve stem. Leakage over the dynamic seal, along the stem or around the seal, will either flow into the actuator or to sea via a leakage path.

The dynamic seals are subject to wear, particularly for valves subject to frequent operation, such as anti surge valves of compressors. Number of open/close cycles, pressure, temperature and speed of movement are limiting parameters with regards to performance. Anti surge valves must have a very fast response in order to protect the compressor, the fast response excludes hydraulic actuators, and the maximum speed is typically limited by the dynamic seals around a stem or spindle.

A demand exists for valves being safer with respect to leakage and loss of control, the objective of the invention is to provide a subsea valve being favorable in this respect.

The closest prior art appears to be the international patent publication WO 2007/149795 A2, which relates to a wellbore flapper valve with an actuator with linear magnetic coupling through a production tubing. The actuator parts outside the production tubing are not protected in a sealed, clean, restricted, small volume and the flapper actuator parts inside the production tubing occupies a substantial part of the production flow bore area.

Another relevant prior art publication is patent application US 2009/0293957 A1 (Vetco), however, the illustrated and described device still has a valve stem with a dynamic seal, and there is no teaching to the person skilled in the art on how to solve the underlying problem of the present invention.

Other patents or applications relate to magnetic gears, such as US 2011/0057456 A1, U.S. Pat. No. 7,487,829 B2, US 2011/0037333, US 2007/215343 A1 and US 2007/125578 A1, relating to magnetic gears allowing gearing between force-torque and stroke-rotation, useful in drive mechanisms. EP 2021667 (Aker Subsea) relates to an electrically operated hydraulic valve with a magnetic coupling. None of publications referred to above, address the underlying problems of the present invention loss of control and pollution.

SUMMARY OF THE INVENTION

The invention meets the demand by providing a subsea valve for control of fluid that can be contaminating and at elevated pressure and temperature, such as well or process fluids, the valve comprising an actuator unit and a valve part, the actuator unit can be operated in order to control the valve part, distinctive in that the actuator unit is magnetically coupled to the valve part and the coupling is through
a barrier wall isolating the actuator unit from the valve part, and
the actuator unit and a driving part of the magnetic coupling are arranged in a sealed actuator housing into which leakage of said contaminating fluid thereby has been eliminated.

The term a sealed housing means that there are no leakage paths from the valve part to the actuator housing, since the barrier wall has no openings or feedthroughs or rotating or sliding shafts with shaft seals going through the wall. The term elevated pressure and temperature, means that the valve can be exposed for high temperature and high pressure, for example at a well shutdown, which can mean a pressure of 700-1000 bar and temperatures exceeding 150° C. in extreme situations.

Preferably, the actuator housing, comprising the barrier wall toward the valve part, is dimensioned to be sufficiently strong so as to eliminate the requirement of a pressure compensator. The barrier wall can be made of Monell, such as Monell K-500, or other high strength non-magnetic material. Accordingly the actuator housing can be filled with oil or gas or a combination. For example, the control electronics can be arranged in nitrogen gas filled housings whilst the rest of the actuator housing where the actuator motor is located is oil-filled, which probably is the most reliable solution. Alternatively, all of the actuator housing can be filled with for example nitrogen gas, at one atmosphere or higher pressure. The actuator housing is not a large diameter structure, accordingly it can be built without pressure compensation without undue thick walls.

Alternatively, the actuator housing is pressure compensated, preferably to equal the surrounding sea water pressure. Preferably an oil filled part of the actuator housing, containing the actuator motor, is pressure compensated, whilst control electronics is arranged in small pressure vessels in the actuator housing.

Alternatively, the pressure is compensated or balanced relative to the fluid controlled by the valve, which may introduce a theoretical leakage path but also allows a constant overpressure to be provided in the actuator housing, eliminating leakage in practice. Thereby the pressure rating of the actuator housing can be reduced, which is particularly relevant if the valve part can be exposed to a very high well shut in pressure.

In a preferred embodiment of the subsea valve of the invention, the barrier wall is a separable double wall, allowing easy retrieval of the actuator housing. This is very favourable for use subsea since it allows easy separation of the actuator housing and the valve part, whilst each part retains its fluid and pressure integrity. The actuator housing is preferably ROV friendly, so that it can be replaced and handled by an ROV (Remotely Operable Vehicle), by having weight as immersed, size and a handle and optional subsea stab connectors adapted for ROV operation. Optionally, the actuator unit is adapted for handling with a ship crane, in addition to an ROV, for example by having lifting lugs conveniently arranged.

Preferably, the driving part of the actuator is one of: a stator; an electromagnetic coil; a set of permanent magnets arranged to a rotating or reciprocating shaft; a set of electromagnets arranged to a rotating or reciprocating shaft; a set of permanent magnets and electromagnets arranged to a rotating or reciprocating shaft.

Preferably, the driven part of the actuator, arranged in the valve part and complementary to the driving part, is one of: a rotor; a magnet arranged on a reciprocating shaft; a set of permanent magnets arranged to a rotating or reciprocating shaft; a set of electromagnets arranged to a rotating or reciprocating shaft; a set of permanent magnets and electromagnets arranged to a rotating or reciprocating shaft.

The term that the driven part of the actuator is complementary to the driving part, means that said parts fit together as a magnetic coupling part set with respect to geometry and movement. For example, a rotating driving part is arranged radially inside a rotating driven part, the barrier wall is between said parts, or vice versa. In general, one of the magnetic coupling parts is radial outside whilst the other part is radial inside, be it rotating or sliding parts. Alternatively, the barrier wall is flat, in which case the coupling interface of said parts are along the flat barrier wall surfaces, on either side.

The magnetic coupling is one of: a 1:1 magnetic drive; a magnetic step up gear; a magnetic step down gear. A 1:1 magnetic drive can be preferable for high strength couplings and thin, strong barrier walls, since pole pieces or similar means are not required in the barrier wall. A magnetic step up gear can be preferably for valves requiring fast response, such as compressor anti surge valves. A magnetic step down gear can be preferable for valves for which slow response but high torque is required, such as manifold system ball valves. In a preferable embodiment, a slow response high torque is provided with an actuator motor with many poles, such as 12, 18, 24, 48 or 96 poles, as a 1:1 magnetic drive.

Preferably, at least for the geared magnetic coupling embodiments, the barrier wall comprises pole pieces or electromagnets or both so as to modulate or change the transmission or gear ratio between the driving and driven parts of the magnetic coupling. Electromagnets, if any, are preferably powered from the actuator housing and electromagnets and pole pieces are preferably arranged in a retrievable part of a double barrier wall so as to allow change of gear ratio by replacing the actuator unit with a barrier wall part having different modulation. The pole pieces are for example embedded ferrite pole pieces.

The valve is preferably a valve for use in subsea petroleum production, processing and pressure boosting systems, such as a production Xmas tree gate valve or a subsea compressor anti surge valve. However, also other types of subsea valves or equipment, with an actuator for operation, with exposure to and possible leakage of contained fluid (such as well or process fluid) at possibly high pressure and temperature, are encompassed by the term subsea valve in this context, such as control valves for other purposes, for example injection of chemicals.

With the valve of the invention, a frictionless or low friction coupling between the actuator housing and valve part is provided, with elimination of leakage paths, pollution problems, dynamic seals and reduction or elimination of mechanical wear, resulting in improved reliability and reduced and easier installation, retrieval, maintenance and replacement.

The barrier wall can comprise electromagnets that can be energised in order to compensate, modulate or nullify actuator magnetic fields and/or permanent magnets energized by electrical motors for the same purpose. This may facilitate assembly, improve the magnetic coupling and allow change of coupling or gear ratio.

In a preferable embodiment, the actuator housing of the subsea valve according to the invention comprises a stator part comprising a number of electromagnetic pole pairs, the valve part comprises a rotor part comprising permanent magnets The actuator unit is in principle similar to an electromotor stator part, without moving parts, the stator part of the actuator is magnetically coupled to the valve part through the single or double barrier wall.

Preferably the valve position is inferred by taking electrical parameters of the actuator as input data, using an algorithm or a look up table.

Preferably the magnetic coupling, with respect to the actuator—valve part coupling, is either a static—rotatable coupling, a static-linear coupling, a rotatable-rotatable coupling, a linear-linear coupling, a rotation-linear coupling or a linear-rotation coupling. Preferably the magnetic coupling is a magnetic gear, providing either enhance torque or force or enhanced speed of operation of the valve part.

Preferably the actuator part comprises permanent magnets or electromagnets, the valve part comprises permanent magnets and the barrier wall comprises ferromagnetic pole pairs, ferrites or electromagnets.

Optionally the valve part comprises one or more mechanical gears for increasing the torque or the force.

The magnetic coupling preferably slips at a maximum torque or force, thereby providing overload protection and reducing or eliminating end stops.

The subsea valve preferably comprises a failsafe mechanism, preferably comprising a magnetic spring, more preferably floating magnetic springs.

In many embodiments the actuator unit preferably comprises a pressure compensator, preferably coupled to the valve unit.

The subsea valve of the invention may include any features as described or illustrated in this document, in any operative combination, each such operative combination is an embodiment of the invention.

FIGURES

Figure 5:
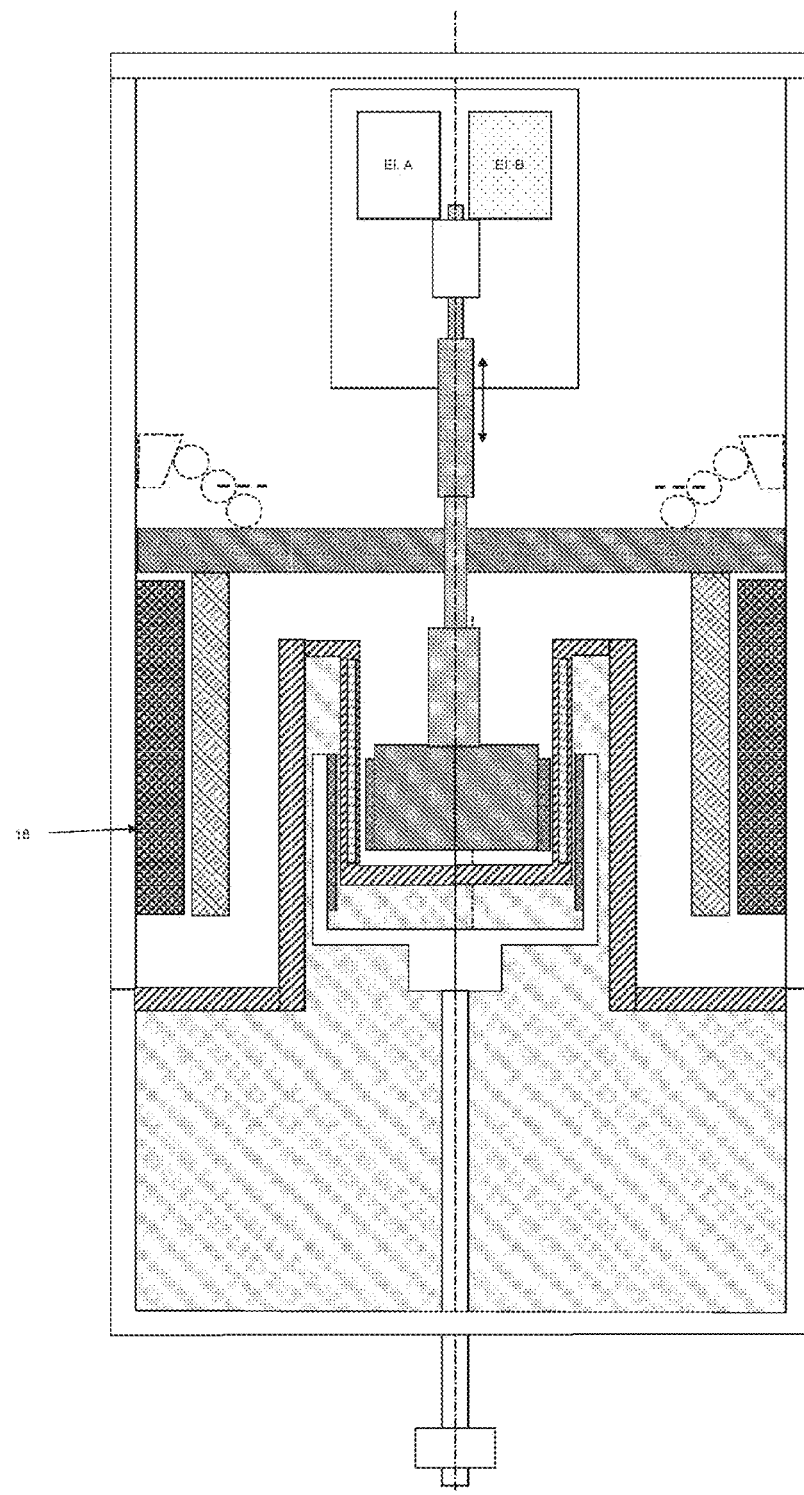

The subsea valve of the invention, or parts thereof, is illustrated with ten figures, of which:

FIGS. 1a and 1b, illustrating an actuator with rotary-rotary magnetic coupling between actuator unit and valve part, of a subsea valve of the invention FIGS. 2a and 2b, illustrating an actuator with linear-linear magnetic coupling, of a subsea valve of the invention, FIGS. 3a and 3b, illustrating an actuator with linear-linear magnetic coupling and a rotary-linear mechanical transmission in the actuator unit, of subsea valve of the invention FIG. 4, illustrating use of floating magnetic springs as failsafe spring in an actuator of a subsea valve of the invention, FIG. 5, also illustrating use of electromagnetic coil spring as failsafe spring in an actuator of a subsea valve of the invention, and FIGS. 6a and 6b, illustrating an actuator housing with a stator as the driving part.

DETAILED DESCRIPTION

Reference is made to FIG. 1a, illustrating an embodiment of the subsea valve of the invention, in normal operation mode. More specifically, an actuator housing 2 with rotating action and magnetic transmission is illustrated, as well as a generalised and simplified valve part 3. The actuator unit 2 is isolated from the valve part 3 by a barrier wall 5, isolating the actuator from the valve part, eliminating leakage or contamination valve fluid into the actuator housing. Leakage of contained fluid into the actuator unit, which would damage said unit, is effectively eliminated. The actuator is regarded as clean, it typically contains pressure compensated hydraulic fluid 10, whilst the valve part volume is regarded as dirty, for example by containing well fluid 14 during operation. The actuator housing comprises electronic units 6, motors 7, and a high speed magnet rotor (HSMR) 8 with bearings 9. The valve part comprises inter alia a low speed magnet rotor (LSMR) 11 with bearings 12, and a driveshaft 13 for operating the valve. The valve is illustrated in normal operation mode in FIG. 1a and in disconnected mode in FIG. 1b, for which the actuator housing has been disconnected. Identical or similar equipment items have the same reference numerical for all drawings. In the normal operation mode illustration 1a, ferrous, ferrite or rare earth mineral material pole pieces 26 are illustrated as embedded in the barrier wall 5, said pole pieces modulate the magnetic coupling to the desired gear ratio. For clarity, said pole pieces are illustrated only in illustration 1a and the other normal operation mode illustrations.

Reference is made to FIG. 2a, illustrating some details of a further valve embodiment of the invention with a linear actuator with magnetic transmission, in normal operation mode. The actuator comprises inter alia a linear actuator 15, such as a linear motor, electronics 6, a high speed linear magnet 16, and a failsafe mechanism including spring 12. The valve part 3 comprises inter alia a high force magnetic transmission assembly 18 and a stem 19, which operates the valve with sliding (linear) movements. The transmission ratio, and thereby torque or force, is related to the ratio of the actuator unit property sliding movement length 16 and the valve part property sliding movement length 21. The actuator unit and the valve part are separated by the barrier wall 5, which contains ferrous, ferrite or rare earth mineral material pole pieces to achieve the desired transmission ratio. Also this valve is illustrated in normal operation mode, in FIG. 2a, and disconnected mode, in FIG. 2b, for which the actuator housing has been disconnected.

The valve may comprise magnetic coupling in the form of rotary to linear magnetic transmissions or linear to rotary magnetic transmissions. An embodiment of some details of a valve with a linear to linear magnetic transmission and a rotary to linear mechanical transmission is illustrated in FIGS. 3a and 3b, to which reference is made, illustrating normal operation mode and disconnected mode, respectively. This embodiment is in principle similar to the embodiment illustrated in FIG. 2, with exception of rotary motors 7, a telescopic shaft 22 and a rotary to linear mechanical transmission 23, such as a rollerscrew or ball screw type gear. For clarity, the remaining equipment items are not provided with reference numericals, instead reference is made to FIG. 2.

The spring providing failsafe function shall be dimensioned to an acceptable size and strength, to overcome the required force to perform a fail safe operation within a given time duration. The spring can be made as a coil, disc or similar metallic spring. Metal springs have been reported to crack during the service life. However, magnetic springs 17 or an electromagnetic coil spring 18 can be used as an alternative to the metallic ones, reference is made to FIGS. 4 and 5. FIG. 4 illustrates the actuator in operative position. The magnetic spring can be assembled from a plurality of short, annular cylindrically shaped permanent magnets. The permanent magnets are each polarized along its cylindrical axis, and are arranged or "stacked". FIG. 5 illustrates the actuator in an operative position. The coil is energized from an external source, for instance a battery. When the coil is energized, the polarized cylinder (being attached to the valve stem) will move and move the valve into a desired position. Using an electromagnetic coil eliminates the requirement for having conventional springs preloaded to high loads during normal operation, hence simplifies the design of the fail safe mechanism and the actuator itself.

Reference is made to FIGS. 6a and 6b, illustrating a valve of the invention for which the actuator housing contains a stator 24 or a coil, in normal operation mode and in disconnected mode, respectively. A stator provides a rotating action whilst a coil or a coil arrangement or coil stack can provide a linear action. The illustrated valve part comprises a permanent magnet rotor 25. The stator and rotor are separated by a barrier wall 5, which may contain ferrous, ferrite or rare earth mineral material pole pieces or electromagnets to achieve the desired transmission ratio. Vessels or canisters for electronics is not illustrated in FIG. 6, but are provided likewise as for the other embodiments.

The invention claimed is:

1. A subsea valve for control of fluid that can be contaminating and at elevated pressure and temperature, the subsea valve comprising:
an actuator unit comprising an actuator housing; and
a valve part;
wherein the actuator unit can be operated in order to control the valve part;
wherein the actuator unit is magnetically coupled, via a magnetic coupling, to the valve part and the magnetic coupling is through a barrier wall isolating the actuator unit from the valve part;

wherein the barrier wall is a separable double wall, allowing retrieval of the actuator housing;

wherein one wall of the separable double wall is part of the actuator housing and the other wall of the separable double wall is part of the valve part; and wherein the actuator unit and a driving part of the magnetic coupling are arranged in the actuator housing, sealed and isolated from the valve part, the sealed actuator housing including one of the separable double walls preventing leakage of said contaminating fluid into the actuator housing while the other separable double wall retains said contaminating fluid in the valve part after retrieving the actuator housing.

2. The subsea valve according to claim 1, wherein the actuator housing, comprising the barrier wall toward the valve part, is filled with at least one of oil and gas thereby eliminating a requirement of a pressure compensator.

3. The subsea valve according to claim 1, wherein the actuator housing is pressure compensated.

4. The subsea valve according to claim 1, wherein the driving part of the actuator is one of:
 a stator; an electromagnetic coil;
 a set of electromagnets arranged to a rotating or reciprocating shaft; and
 a set of permanent magnets and electromagnets arranged to a rotating or reciprocating shaft.

5. The subsea valve according to claim 1, wherein the driven part of the actuator, arranged in the valve part and complementary to the driving part, is one of:
 a rotor; a magnet arranged on a reciprocating shaft;
 a set of electromagnets arranged to a rotating or reciprocating shaft; and
 a set of permanent magnets and electromagnets arranged to a rotating or reciprocating shaft.

6. The subsea valve according to claim 1, wherein the magnetic coupling is one of: a 1:1 magnetic drive; a magnetic step up gear; and a magnetic step down gear.

7. The subsea valve according to claim 1, wherein the barrier wall comprises pole pieces or electromagnets so as to modulate or change a transmission or gear ratio between the driving and driven parts of the magnetic coupling, electromagnets are powered from the actuator housing and electromagnets and pole pieces are arranged in a retrievable part of a double barrier wall so as to allow change of gear ratio by replacing the actuator unit with a barrier wall part having a different modulation.

8. The subsea valve according to claim 1, wherein the valve is without any leakage path for possible contaminating fluid since there is no seal on a rotating or sliding valve stem, spindle or handle since there is no feedthroughs in the barrier wall.

9. The subsea valve of claim 1, wherein the subsea valve is one of:
 a subsea Xmas tree gate valve opening or closing in about 20 seconds, the actuator unit delivering reciprocating movement at 200 kN minimum and stroke length up to about 214 mm, for which the actuator unit movement is stepped down in a step down gear;
 a subsea flow control, choke or control system control valve, opening or closing or adjusting set position in about 2 seconds, for which the actuator unit movement is stepped up;
 a subsea ball valve for controlling subsea manifold system flows, for which a ¼ turn in about two minutes at torque up to about 30,000 Nm is delivered by the actuator, for which the actuator unit movement is stepped down in at least one step, at least one of the steps can be the magnetic coupling and at least one of the steps can be arranged in a retrievable actuator housing; and
 a subsea anti surge valve.

10. The subsea valve according to claim 1, wherein at least one of the valve part and the actuator housing comprises a mechanical gear for increasing torque or force.

11. The subsea valve according to claim 1, comprising a failsafe mechanism, comprising a magnetic spring, floating magnetic springs.

* * * * *